US011058050B2

(12) United States Patent
Yarberry

(10) Patent No.: US 11,058,050 B2
(45) Date of Patent: Jul. 13, 2021

(54) VARIABLE WIDTH CUTTING SYSTEM

(71) Applicant: Kyle Edward Yarberry, Bainbridge Island, WA (US)

(72) Inventor: Kyle Edward Yarberry, Bainbridge Island, WA (US)

( * ) Notice: Subject to any disclaimer, the term of this patent is extended or adjusted under 35 U.S.C. 154(b) by 513 days.

(21) Appl. No.: 15/953,424

(22) Filed: Apr. 14, 2018

(65) Prior Publication Data

US 2018/0228083 A1 Aug. 16, 2018

Related U.S. Application Data

(63) Continuation of application No. 14/884,617, filed on Oct. 15, 2015, now Pat. No. 9,968,032.

(60) Provisional application No. 62/100,835, filed on Jan. 7, 2015.

(51) Int. Cl.
*A01D 75/30* (2006.01)
*A01D 34/44* (2006.01)
*A01D 34/62* (2006.01)
*A01B 73/00* (2006.01)

(52) U.S. Cl.
CPC .............. *A01D 34/44* (2013.01); *A01B 73/00* (2013.01); *A01D 34/62* (2013.01); *A01D 75/306* (2013.01)

(58) Field of Classification Search
CPC ...... A01D 34/44; A01D 75/306; A01D 34/62; A01B 73/00
USPC ......................................................... 56/6, 7
See application file for complete search history.

(56) References Cited

U.S. PATENT DOCUMENTS

| | | | |
|---|---|---|---|
| 2,753,674 A | 7/1956 | Cunningham | |
| 3,090,184 A | 5/1963 | Hadek | |
| 4,213,628 A * | 7/1980 | Hardesty | A01B 73/067 280/412 |
| 4,344,639 A * | 8/1982 | Pollard | A01B 73/00 56/6 |
| 4,346,909 A * | 8/1982 | Hundeby | A01B 73/005 172/248 |
| 4,381,118 A * | 4/1983 | Weeks | A01B 73/00 172/311 |
| 4,415,174 A * | 11/1983 | Koehn | A01D 75/30 172/314 |
| 4,445,706 A * | 5/1984 | Jarosek | B62D 53/067 111/57 |
| 4,577,881 A * | 3/1986 | Gerber | A01B 73/00 172/311 |
| 4,601,484 A * | 7/1986 | Baker | A01B 73/00 172/310 |
| 4,637,625 A * | 1/1987 | Blackwell | B60D 1/42 172/314 |
| 4,896,485 A * | 1/1990 | Gordy | A01D 75/30 172/313 |
| 4,964,265 A | 10/1990 | Young | |
| 5,007,234 A | 4/1991 | Shurman | |

(Continued)

*Primary Examiner* — Thomas B Will
*Assistant Examiner* — Mai T Nguyen

(57) ABSTRACT

A mower includes a plurality of cutting heads, each cutting head having a minor cutting width, the plurality of cutting heads connected by a plurality of connectors in an array having a variable major cutting width. The mower also includes a steering system coupled with a first driven wheel and supported by one cutting head, and a second driven wheel supported by one other cutting head. The steering system is capable of steering the first driven wheel independently from the second driven wheel.

20 Claims, 31 Drawing Sheets

(56) References Cited

U.S. PATENT DOCUMENTS

| | | | |
|---|---|---|---|
| 5,109,655 A * | 5/1992 | Tekulve | A01D 75/30 56/13.6 |
| 5,261,497 A | 11/1993 | Snyder | |
| 5,265,898 A * | 11/1993 | Houck | B62D 49/065 172/311 |
| 6,131,378 A * | 10/2000 | Lees | A01D 75/303 56/13.6 |
| 6,321,515 B1 | 11/2001 | Colens | |
| 6,604,348 B2 | 8/2003 | Hunt | |
| 6,611,738 B2 | 8/2003 | Ruffner | |
| 7,024,842 B2 | 4/2006 | Hunt | |
| 7,418,328 B2 | 8/2008 | Romig | |
| 7,617,890 B2 | 11/2009 | Romig | |
| 7,793,487 B1 | 9/2010 | Schnell | |
| 9,072,214 B2 | 7/2015 | Connors | |
| 2002/0184865 A1 | 12/2002 | Short | |
| 2006/0059880 A1 | 3/2006 | Angott | |
| 2006/0090438 A1 | 5/2006 | Hunt | |
| 2007/0080000 A1 | 4/2007 | Tobey | |
| 2013/0160413 A1 | 7/2013 | Coffin | |
| 2015/0189830 A1 | 7/2015 | Jagenstedt | |

\* cited by examiner

VARIABLE WIDTH CUTTING SYSTEM

RELATED APPLICATIONS

This application claims priority from U.S. Non-Provisional patent application Ser. No. 14/884,617, filed Oct. 15, 2015, which claims the benefit of U.S. Provisional Patent Application No. 62/100,835, filed Jan. 7, 2015. The entire contents of both applications are hereby incorporated by reference.

BACKGROUND

The invention relates to mowers having a plurality of cutting heads for cutting large areas of grass.

SUMMARY

Mowers cut grass in a wide variety of applications, ranging in size from residential lots, to athletic fields, to expansive turf farms. For mowers known in the art, cutting rate is generally calculated as forward speed multiplied by cutting width. Therefore, the cutting rate of a mower known in the art increases linearly as either the cutting width or forward speed increases, all else equal. This linear relationship limits productivity and efficiency gains deliverable by large mowers known in the art. It would therefore advance the art to provide a mower and a method of use whereby cutting rate is not constrained by a linear relationship to the cutting width.

Mowers with wide cutting widths face access problems. That is, a mower can generally only traverse openings wider than its widest point. This limitation can force users to use a narrower mower than would otherwise more efficiently handle a job. For example, some lots are accessible only through gates; in the residential context, this can effectively prohibit the use of mowers wider than 30-36 inches when wider equipment would otherwise mow the lot in less time. To alleviate this problem, certain large mowers feature retractable cutting decks (e.g., bat wing configurations), to the detriment of expense and complexity. For residential and smaller commercial applications however, mowers with cutting widths less than 72 inches generally lack the capability to overcome this challenge. It would therefore advance the art to provide a mower capable of traversing passageways much narrower than its cutting width.

In addition to the aforementioned shortcomings, large commercial mowers face mobility problems between job sites. For example, trailer size can limit a user's choice of equipment even if larger mowers would otherwise meet the user's needs more efficiently. It would therefore advance the art to provide a mower capable of altering its dimensions, so that it offers a higher cutting rate relative to its footprint.

With few exceptions, the cutting widths of mowers known in the art are fixed. This is undesirable because it limits a mower's applications. It also requires the user to choose between investing in different mower sizes for different applications, using non-optimally sized equipment for certain jobs, or forgoing certain jobs entirely. To enable users to utilize one piece of equipment for numerous job sizes, it would advance the art to provide a mower with an adjustable cutting width.

In summary, it would advance the mower art to provide a mower and a method of use whereby cutting rate is not constrained by a linear relationship to the cutting width, wherein the mower has an adjustable cutting width, greater accessibility and mobility relative to its cutting rate.

Accordingly, the invention provides, in one aspect, a mower. The mower includes a plurality of cutting heads, each cutting head having a minor cutting width, the plurality of cutting heads connected by a plurality of connectors in an array having a variable major cutting width, which can be measured along a major cutting width axis. The mower also includes a steering system coupled with a first driven wheel and supported by one cutting head, and a second driven wheel supported by one other cutting head. The steering system is capable of steering the first driven wheel independently from the second driven wheel.

In another aspect, the invention provides a mower having at least one connector translatably joining at least one cutting head to at least one other cutting head. At least one connector may pivotably join at least one cutting head to at least one other cutting head. At least one connector may have a first retainer connected to a second retainer. The first retainer may translatably receive at least one cutting head, and the second retainer may translatably receive at least one other cutting heads.

In another aspect, the invention provides a mower having at least three cutting heads. In another aspect, the minor cutting width of at least one cutting head is between twenty and seventy-two inches, inclusive. In another aspect, the minor cutting width of at least one cutting head is at least seventy-two inches. In another aspect, the maximum major cutting width of the mower is at least one hundred inches. In another aspect, the mower has a transport width less than seventy-two inches.

In another aspect, the invention provides a method for using a mower, the mower including a plurality of cutting heads connected by a plurality of connectors in an array having a variable major cutting width. The mower has a first steering system coupled with a first driven wheel and supported by one cutting head, and a second steering system coupled with a second driven wheel and supported by one other cutting head.

In one aspect, the invention provides a method for using a mower as described above, the method including the steps of steering the first driven wheel and driving the first driven wheel. In another aspect, the method includes the additional steps of steering the second driven wheel and driving the second driven wheel. When the steps of the method are performed, the mower achieves a cutting rate proportional to the square of the major cutting width, wherein the cutting rate can be modeled by an equitation having an exponential component, such as $C=(1-k)z\Pi r^2$, where C corresponds to cutting rate, k corresponds to a loss factor, z corresponds to a rotational rate, and r corresponds to the major cutting width.

In another aspect, the method includes steering the first driven wheel and second driven wheel so that their respective directions of travel are approximately perpendicular to the major cutting width axis. The first driven wheel may be driven for a period of time sufficiently long to cause the mower to pivot at least approximately one hundred eighty degrees about the second driven wheel. Before or after driving first driven wheel, the second driven wheel may be driven for a period of time sufficiently long to cause the mower to pivot at least approximately one hundred eighty degrees about the first driven wheel.

In another aspect, the invention provides a method for varying the major cutting width of the mower, wherein the first driven wheel is steered so that its direction of travel is approximately parallel to the major cutting width axis and driven in a direction approximately parallel to the major cutting width axis. Additionally, the second driven wheel may be steered so that its direction of travel is approximately parallel to the major cutting width axis and driven in a direction approximately parallel to the major cutting width axis. When performing such a method, the first driven wheel and second driven wheel may be driven simultaneously or sequentially.

In another aspect, the invention provides a method for varying the maximum major cutting width of a mower having a plurality of cutting heads connected in an array by a plurality of connectors, a first driven wheel supported by one cutting head of the plurality of cutting heads, a second driven wheel supported by one other cutting head of the plurality of cutting heads, and a steering system for steering the first driven wheel independently from the second driven wheel. The method includes the steps of disconnecting a first cutting head from a second cutting head, inserting an intermediate cutting head between the first cutting head and the second cutting head, connecting the first cutting head to the intermediate cutting head, and connecting the second cutting head to the intermediate cutting head. In another aspect, connectors may be used to connect the first cutting head and second cutting head to the intermediate cutting head.

Other aspects of the invention will become apparent by consideration of the detailed description and accompanying drawings.

DETAILED DESCRIPTION OF THE DRAWINGS

Before any embodiments of the invention are explained in detail, it is to be understood that the invention is not limited in its application to the details of construction and the arrangement of components set forth in the following description or illustrated in the following drawings. The invention is capable of other embodiments and of being practiced in various ways. As used in this application to modify values or relationships, the word "approximately" means "within ten percent."

Figure 1A:
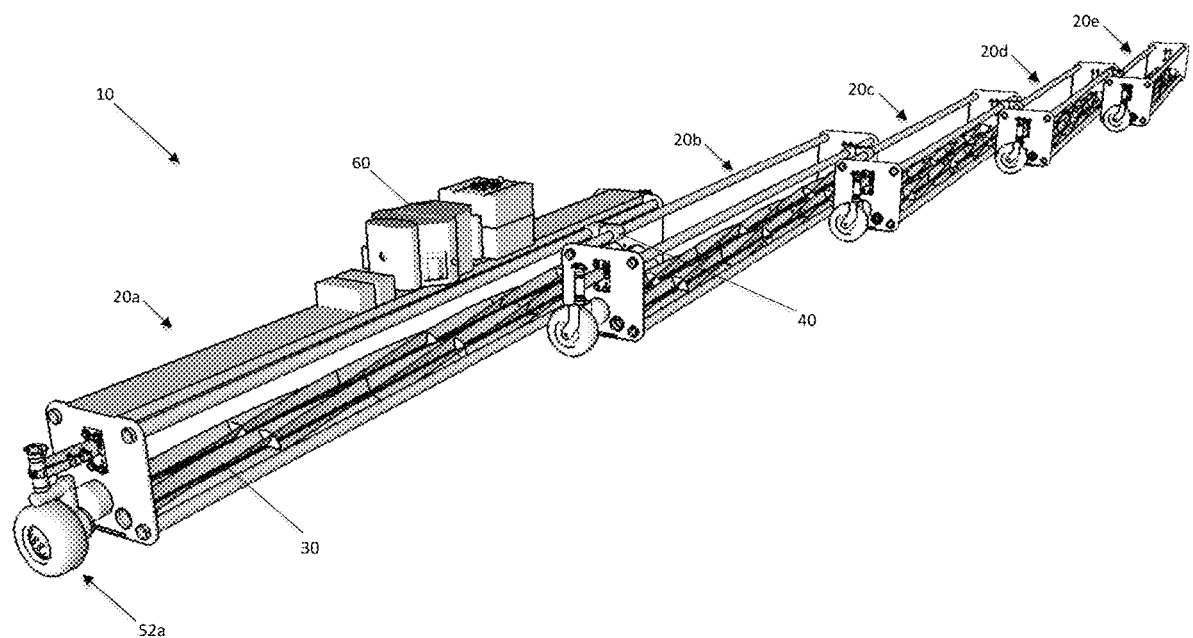
FIG. 1A shows a front perspective view of a mower in an extended position according to one embodiment of the invention.
Figure 1B:
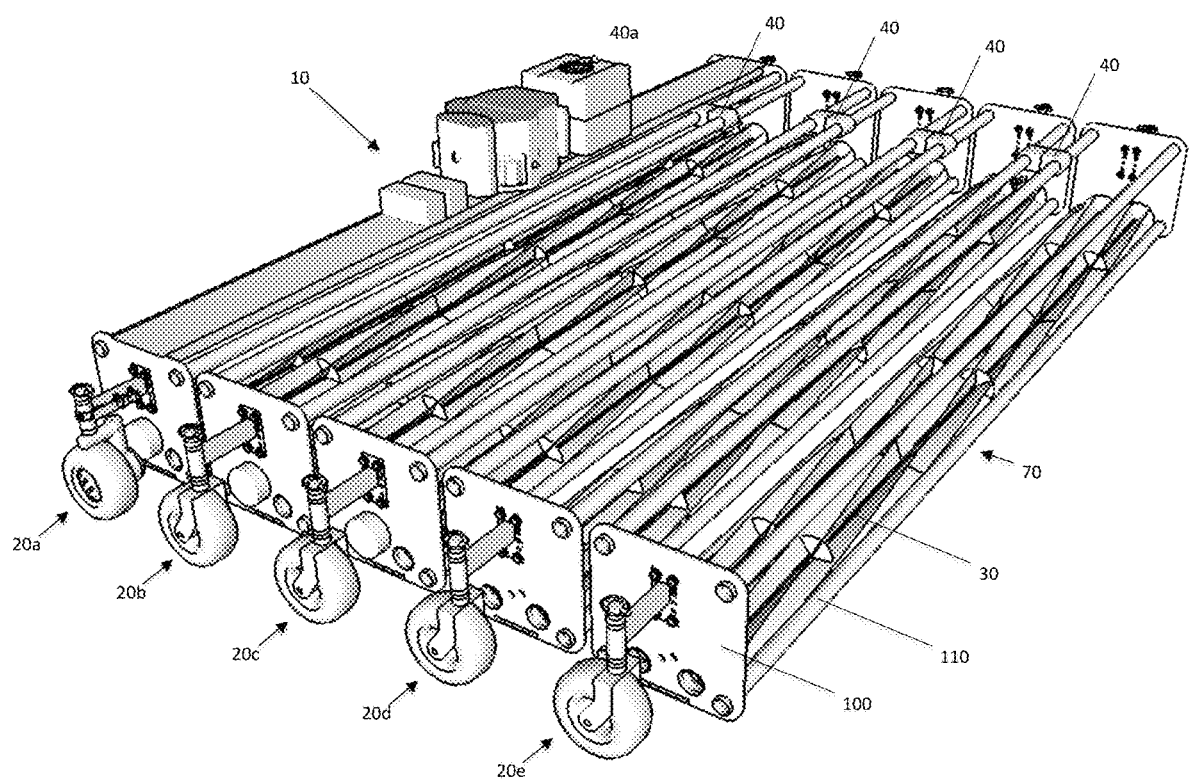
FIG. 1B shows a front perspective view of a mower in a collapsed position according to one embodiment of the invention.
Figure 1C:
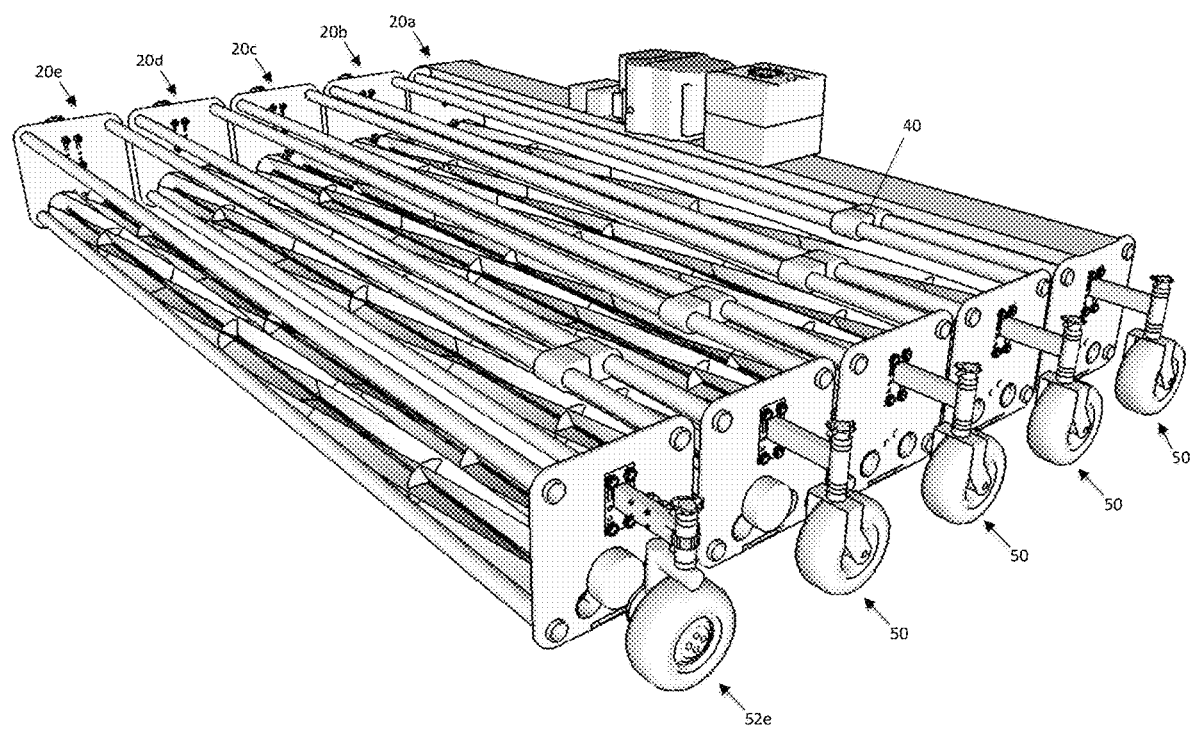
FIG. 1C shows a rear perspective view of a mower in a collapsed position according to one embodiment of the invention.
Figure 2A:
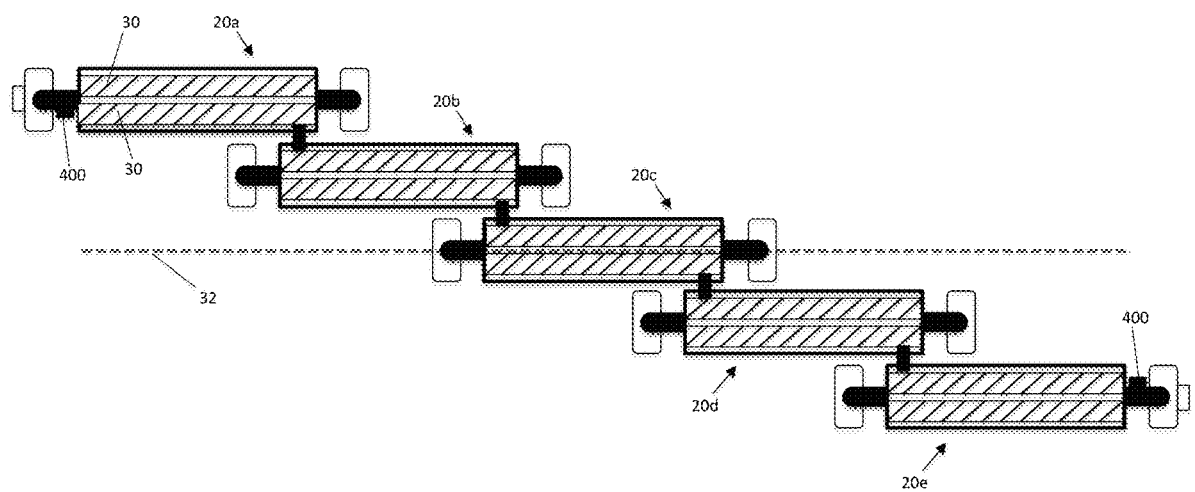
FIG. 2A shows a top schematic view of a mower in an extended position according to one embodiment of the invention.
Figure 2B:
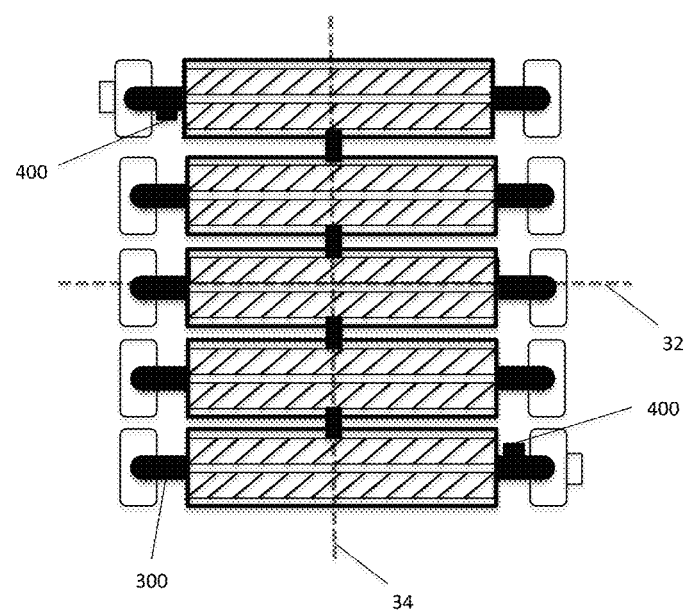
FIG. 2B shows a top schematic view of a mower in a collapsed position according to one embodiment of the invention.
Figure 3A:
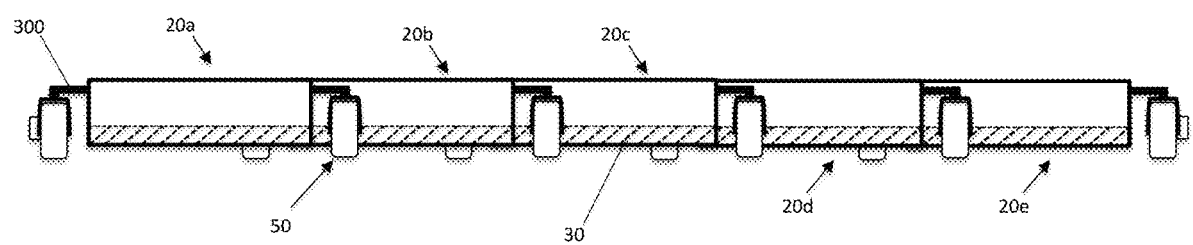
FIG. 3A shows a front schematic view of a mower in an unarticulated position according to one embodiment of the invention.
Figure 3B:
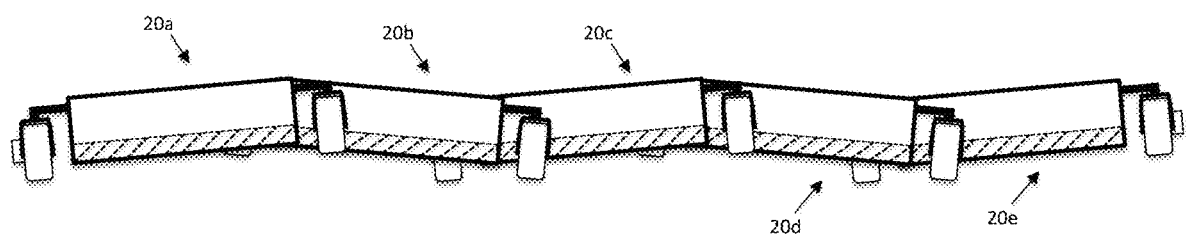
FIG. 3B shows a front schematic view of a mower in an articulated position according to one embodiment of the invention.
Figure 3C:
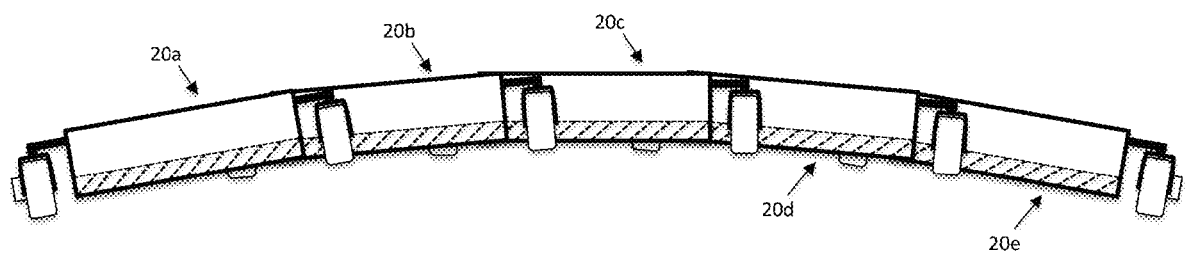
FIG. 3C shows a front schematic view of a mower in another articulated position according to one embodiment of the invention.
Figure 4A:
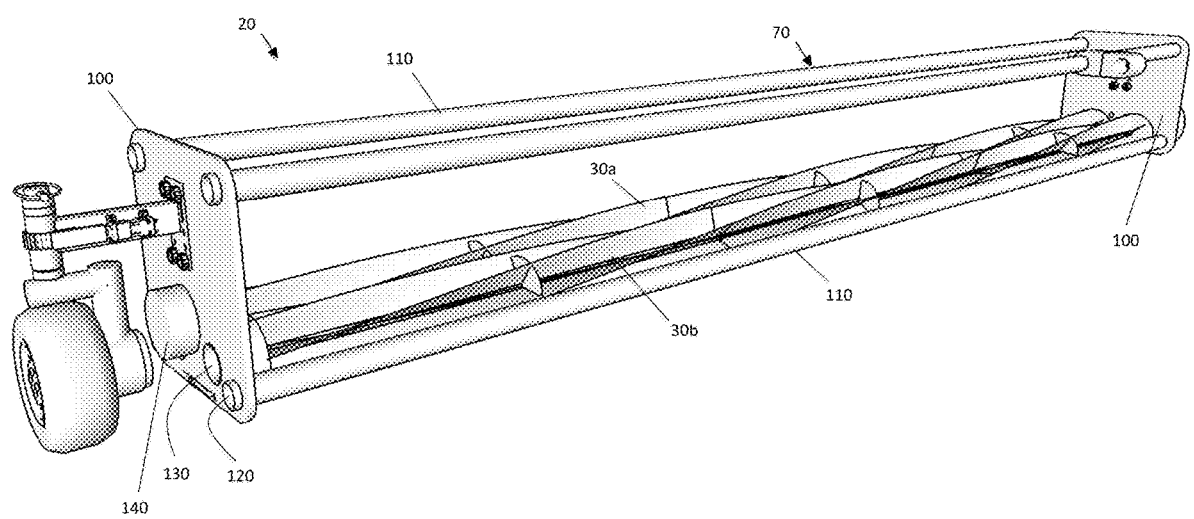
FIG. 4A shows a front perspective view of one cutting head according to one embodiment of the invention.
Figure 4B:
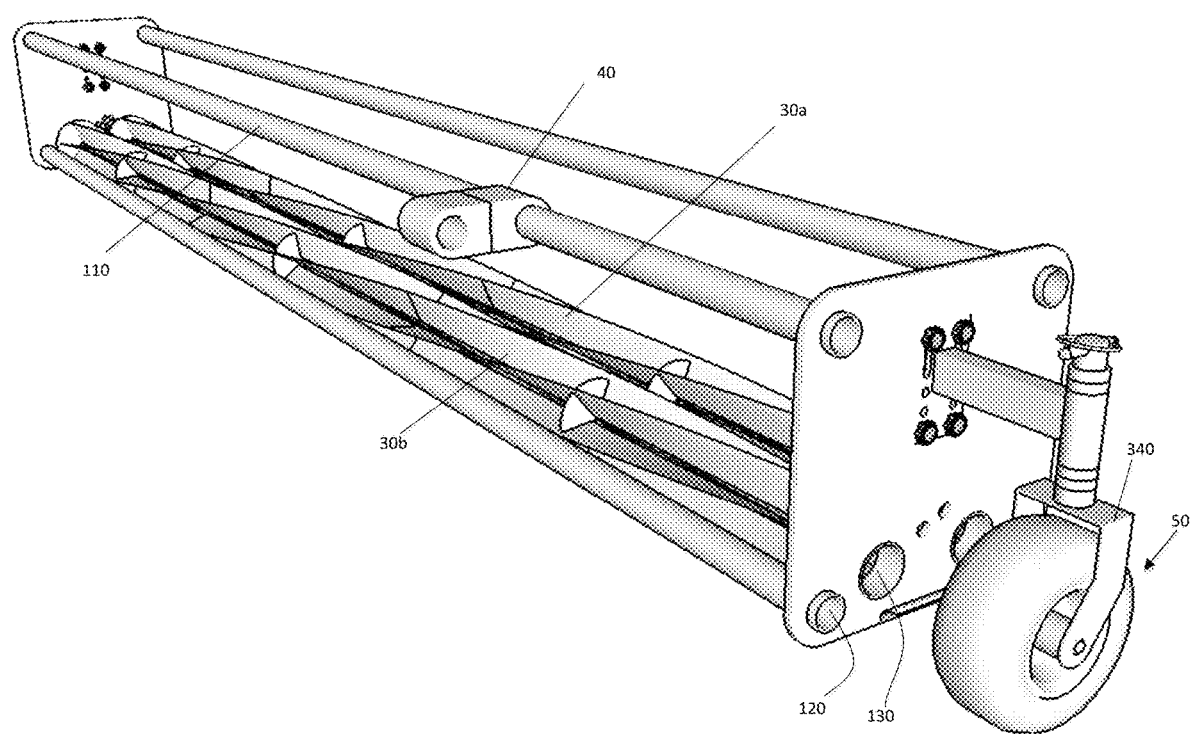
FIG. 4B shows a rear perspective view of one cutting head according to one embodiment of the invention.
Figure 4C:
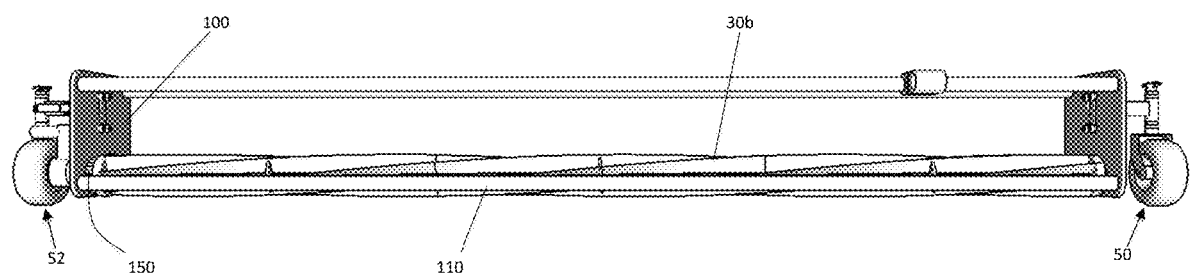
FIG. 4C shows a front view of one cutting head according to one embodiment of the invention.
Figure 4D:
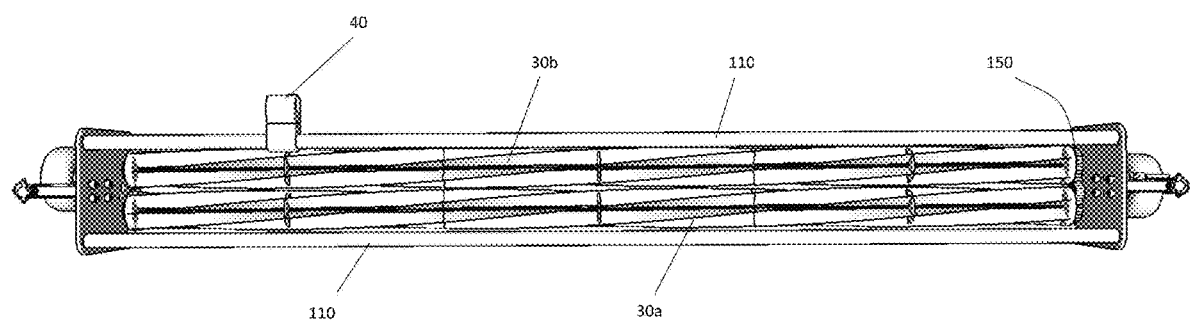
FIG. 4D shows a top view of one cutting head according to one embodiment of the invention.
Figure 4E:
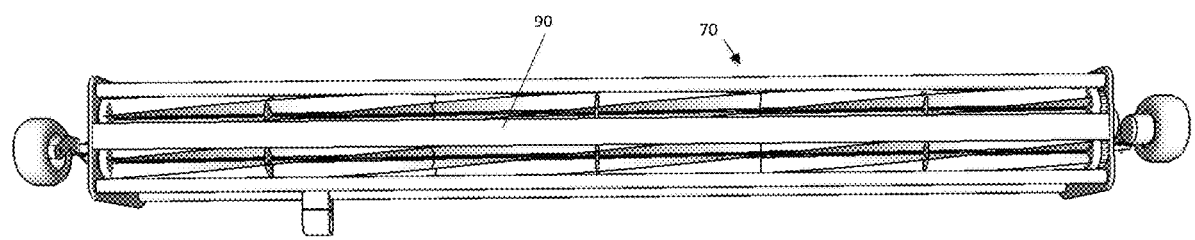
FIG. 4E shows a bottom view of one cutting head according to one embodiment of the invention.
Figure 4F:
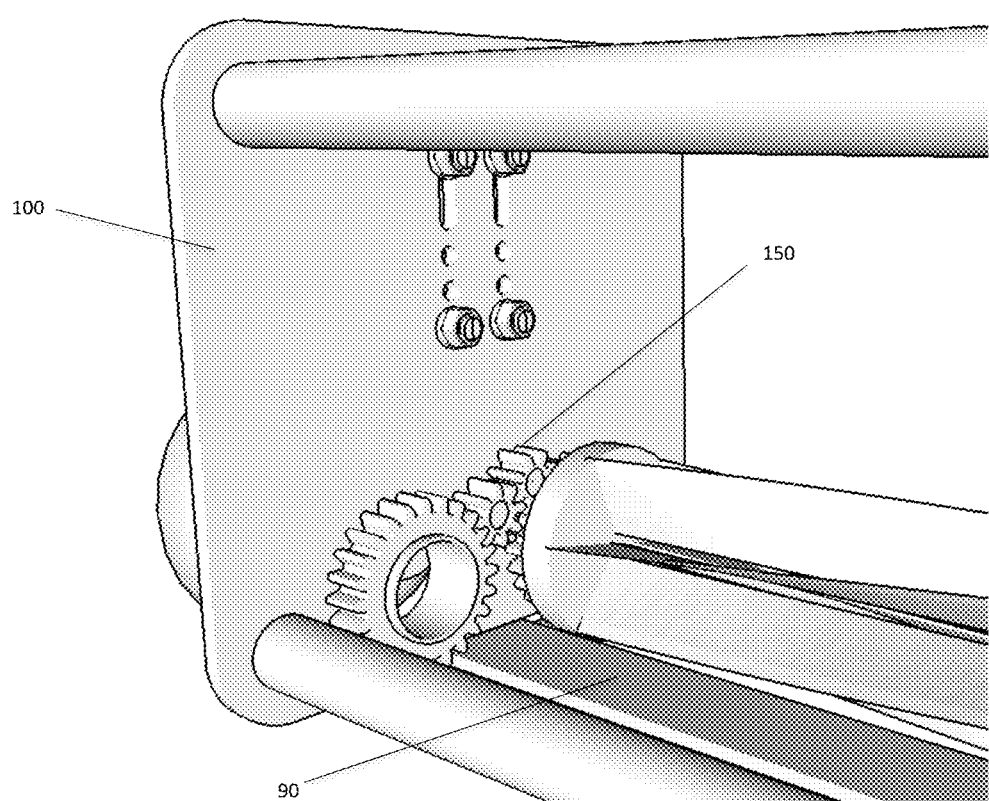
FIG. 4F shows a close up view of a geartrain and cutting blade of one cutting head according to one embodiment of the invention, with a cutting reel removed.

With reference to FIGS. 1A-3C, a mower 10 includes a modular array of connected cutting heads 20, including two outer-most cutting heads and optionally one or more intermediate cutting heads. Each cutting head 20 has a minor cutting width, generally defined as the width of a strip of grass the cutting head 20 could cut. For example, the minor cutting width may reflect the width of a cutting reel 30 supported by cutting head 20, or alternatively by the sum of the widths of a plurality of cutting reels 30 or cutting blades supported by cutting head 20. Embodiments constructed for applications without space constraints may feature large minor cutting widths, e.g., at least seventy-two inches, whereas embodiments constructed for applications with space constraints (e.g., applications constrained by trailer are access dimensions) may feature smaller minor cutting widths, e.g., between twenty and seventy-two inches, inclusive. Connectors 40 between each cutting head 20 enable relative translation (as shown by comparing FIGS. 1A and 1B) and pivoting (as shown in FIGS. 3A-3C). Mower 10 has a variable major cutting width corresponding to a major cutting width axis 32, and equal to the sum of the minor cutting widths of cutting heads 20, less any overlap between cutting heads 20. A small amount of overlap between cutting heads 20 is ideal in order to prevent "streaking," or strips of uncut grass between cutting heads. Accordingly, when the overlap between cutting heads 20 is relatively small, as shown in FIGS. 1A and 2A, the major cutting width can be quite large. On the other hand, when the cutting heads 20 overlap entirely as shown in FIGS. 1B and 2B, the major cutting width is approximately equal to the width of a single cutting head 20. Embodiments constructed for applications without space constraints may feature large maximum major cutting widths, e.g., at least one hundred inches, whereas embodiments constructed for applications with space constraints may feature maximum major cutting widths less than one hundred inches. Referring to FIG. 2B, the mower 10 may be further characterized by its transport width, which is the minimum width of mower 10 measured along the transport width axis 34. Embodiments constructed for applications with space constraints may feature smaller transport widths, e.g., less than seventy-two inches.

Each cutting head 20 includes at least one wheel 50. Additionally, each outer-most cutting head 20 includes a driven wheel 52 that is ideally steerable. An internal combustion engine, battery, solar panel, or other on-board power source 60 may power mower 10; alternatively, mower 10 may draw power from a remote source, such as an electric grid or generator, or may be human-powered. An operator may control mower 10 by hydraulic, pneumatic, or electrical means, as known in the art. Hydraulic, pneumatic, and/or electrical connections between components are known in the art and presumed to function.

Figure 10:
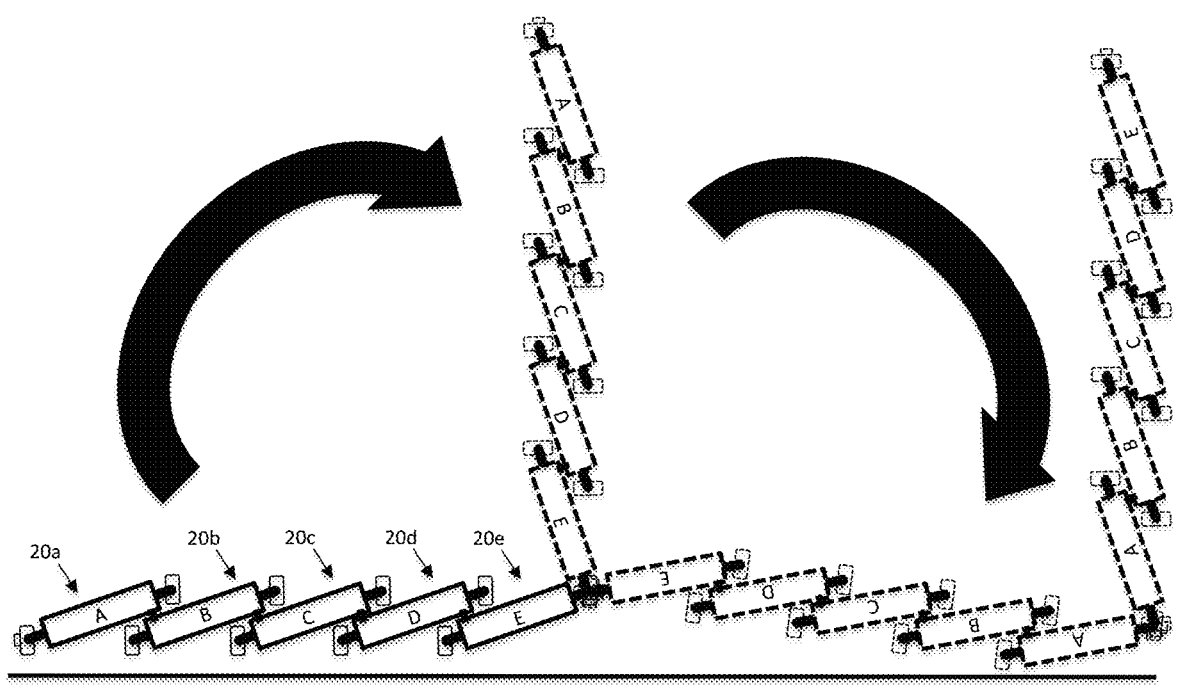
FIG. 10 schematically shows a rotational cutting method according to one embodiment of the invention.
Figure 11A:
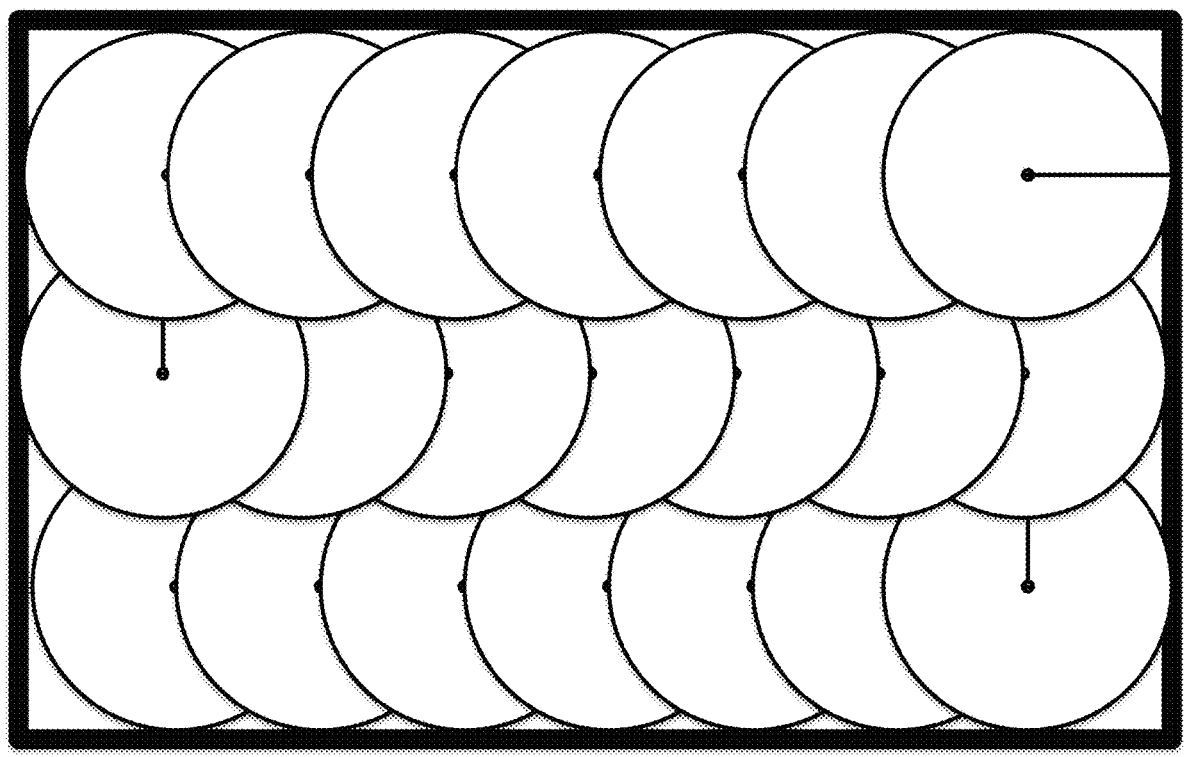
FIG. 11A schematically shows a cutting pattern made possible by a mower according to one embodiment of the invention.
Figure 11B:
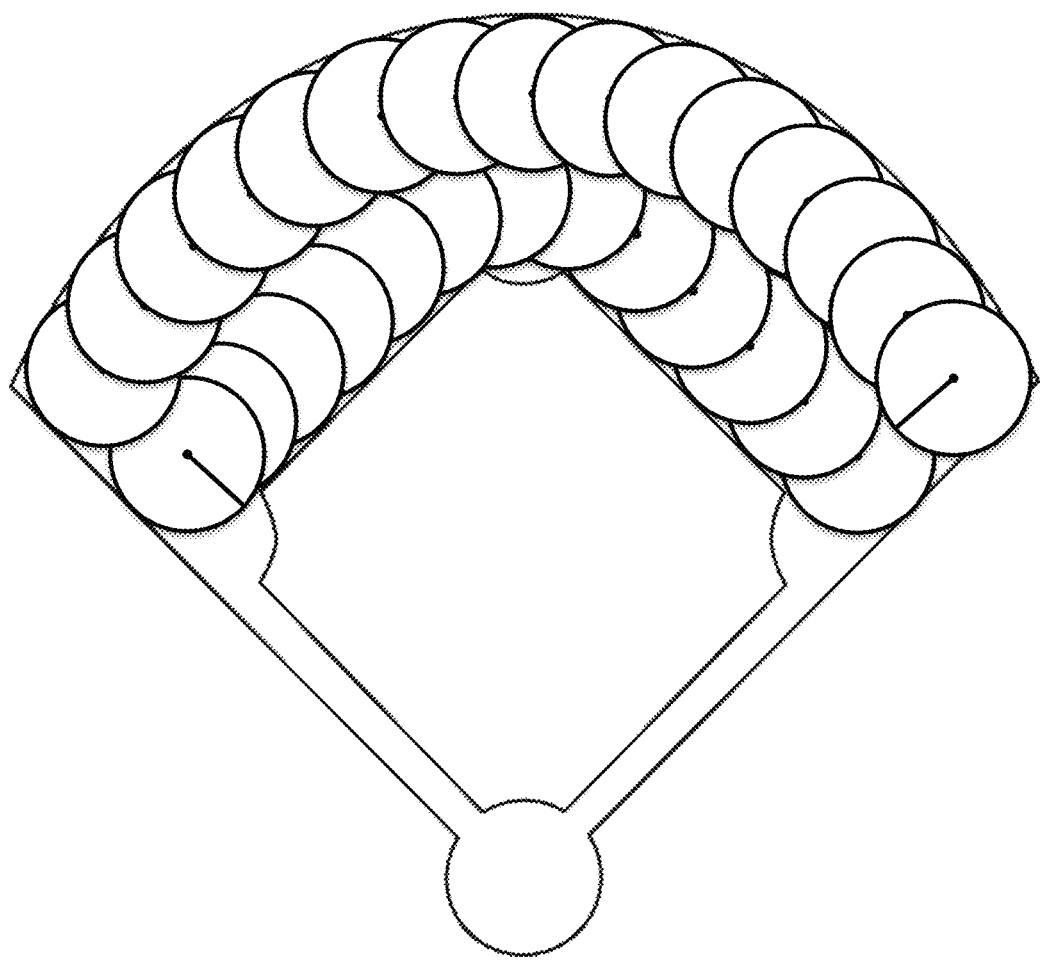
FIG. 11B schematically shows another cutting pattern made possible by a mower according to one embodiment of the invention.

In operation, by performing a rotational cutting method, described below, mower 10 can cut grass in a novel end-over-end manner as shown in FIG. 10. The cutting rate of the mower 10 while performing the rotational cutting method is proportional to the square of the major cutting width. Intuitively, as the major cutting width and the rotational rate increase, mower 10 can achieve very large cutting capacities. Additionally, the rotational cutting method enables mowing patterns not easily achievable by mowers known in the art, including circular and scalloped patterns as illustrated in FIGS. 11A and 11B.

In addition to mowing in an end-over-end manner, mower 10 can cut grass in a linear manner by performing a translation method described below, which also enables it to traverse openings narrower than its major cutting width. By performing a width adjustment method, described below, mower 10 may assume an extended arrangement with a maximum major cutting width, a compact arrangement with a minimum major cutting width, and many intermediate arrangements. In the extended arrangement shown in FIGS. 1A and 2A, cutting heads 20 are positioned with minimal overlap to maximize the major cutting width. In the compact arrangement, cutting heads 20 are positioned with maximum overlap to minimize the major cutting width and to consolidate the footprint of the mower 10 (e.g., to facilitate transportation). By performing a modular adjustment method, described below, the user can add or remove cutting heads 20 to increase or decrease the maximum major cutting width, respectively. Altogether, mower 10 and its methods of use enable a user to cut grass efficiently, adjust the major cutting width for specific jobs and transportation requirements, traverse narrow passages, and create circular, scalloped, and other nonlinear mowing patterns.

The mower 10 has a modular construction to facilitate increases or reductions to the major cutting width. That is, the user may attach additional cutting heads 20 to mower 10 in order to increase its overall cutting rate. Likewise, the user may remove cutting heads 20, for example to accommodate the requirements of a particular job, or to interchangeably use a cutting head 20 on another mower 10 built according to the present invention. To enable this modularity, cutting heads 20 may feature common dimensions and structure such as connector 40 described below, along with quick release hydraulic and/or electrical connections.

With reference to FIGS. 4A-4F, each cutting head 20 includes an elongate frame 70 that supports at least one cutting reel 30 and at least one cutting blade 90. Additionally, frame 70 may support other components, including wheels 50, and hydraulic and/or electrical equipment. In the illustrated embodiment, frame 70 includes two end plates 100 connected to opposing ends of frame elements 110. End plates 100 may be constructed from metal (e.g., stamped steel or aluminum), injection molded plastic, or other rigid material. End plates 100 support the ends of frame elements 110, such as by receiving them through apertures 120. In the illustrated embodiment, apertures 120 are positioned toward the perimeter of end plates 100 to increase the internal space bounded by frame elements 110. Alternatively, frame elements 110 could be arranged in a vertically-biased configuration, such as to increase cutting head's 20 resistance to bending, or in another configuration. It is generally desirable to increase each cutting head's 20 resistance to bending (e.g., bending caused by the weight supported by the frame 70). Welding each frame element 110 to each corresponding end plate 100 can improve resistance to bending. However, other permanent or temporary joining methods may be used to affix the positions of the end plates 100 toward the ends of frame elements 110, including but not limited to friction fitting, clamping, fastening, and threading. Regardless of the joining method, the position of each end plate 100 should be at least temporarily fixed with respect to the length of each frame element 110.

The embodiment of cutting head 20 illustrated in FIGS. 4A-4F includes four frame elements 110 and two end plates 100. Each frame element 110 has a single finite length, although each frame element 110 could alternatively include an assembly of sub elements, for example sub elements axially connected by threading, welding, or other joining method. Additional or fewer frame elements 110 may be desirable to increase the strength of cutting head 20 or to reduce weight and cost, respectively. In the illustrated embodiment, the cross section of frame elements 110 is cylindrical, but may alternatively be polygonal, any number of structural shapes such as symmetrical I-shapes, asymmetrical I-shapes, wide flange I-shapes, S-shapes, Z-shapes, C-shapes, Tee-shapes, hollow structural sections, single angle sections, and double angle sections, or reflect another shape. As noted above, it is desirable to increase each cutting head's 20 resistance to bending, the objective being to ensure an approximately uniform distance between the ground along the length of cutting blade 90. With the realization that bending cannot be entirely eliminated, it may be desirable for each frame element 110 to exhibit some preloaded deflection relative to its elongate axis in order to counteract deflection resulting from weight supported by frame 70. It is envisioned that frame elements 110 will be constructed of aluminum, steel, or other metal, but could instead be manufactured from other materials, such as but not limited to plastic or organic material. Frame elements 110 may support a protective cover (e.g., a deck, fairing, shroud, not shown in the illustrated embodiment) to enhance safety. A cover that prevents debris from escaping from cutting head 20 may be important for those embodiments that support rotary cutting assemblies, as described below.

The cutting head 20 illustrated in FIGS. 4A-4F includes two cutting reels 30*a*, 30*b*, the construction of which are known in the art. End plates 100 support a first cutting reel 30*a* approximately parallel to a second cutting reel 30*b*, each cutting reel 30*a*, 30*b* having two ends and approximately equal lengths that define the minor cutting width. Each cutting reel 30*a*, 30*b* may be constructed as a single reel or alternatively may include an end-to-end assembly of two or more smaller reels. Frame 70 supports each end of cutting reels 30*a*, 30*b* in a horizontal orientation with respect to the ground. For example, reel apertures 130 in each end plate could contain reel bearings that support each end of cutting reels 30*a*, 30*b*. A hydraulic reel motor 140 rotates first reel 30*a* about its longitudinal axis. Reel motor 140 could alternatively be electrically-powered. In the illustrated embodiment, a geartrain 150 connecting the first and second reels 30*a*, 30*b* causes second reel 30*b* to rotate about its longitudinal axis in the opposite direction from first reel 30*a*.

End plates 100 support cutting blade 90 in between and approximately parallel to cutting reels 30*a*, 30*b*. Cutting blade 90 has a length approximately equal to the total length of cutting head 20. Frame 70 supports blade 90 so that its first and second edges are approximately tangential to the circumferences of cutting reels 30*a*, 30*b*, respectively. To ensure cutting blade 90 maintains a uniform distance from the ground, it may be desirable include an additional support at one or more intermediate points along its length. For example, two cantilevered supports projecting perpendicularly from each end plate 100 may affix to either end of cutting blade 90. In operation, reel motor 140 causes cutting reels 30*a*, 30*b* to rotate counter to each other. The reel blades of cutting reels 30*a*, 30*b* capture grass and sweep it against the edges of blade 90, thereby cutting the grass.

Figure 5A:
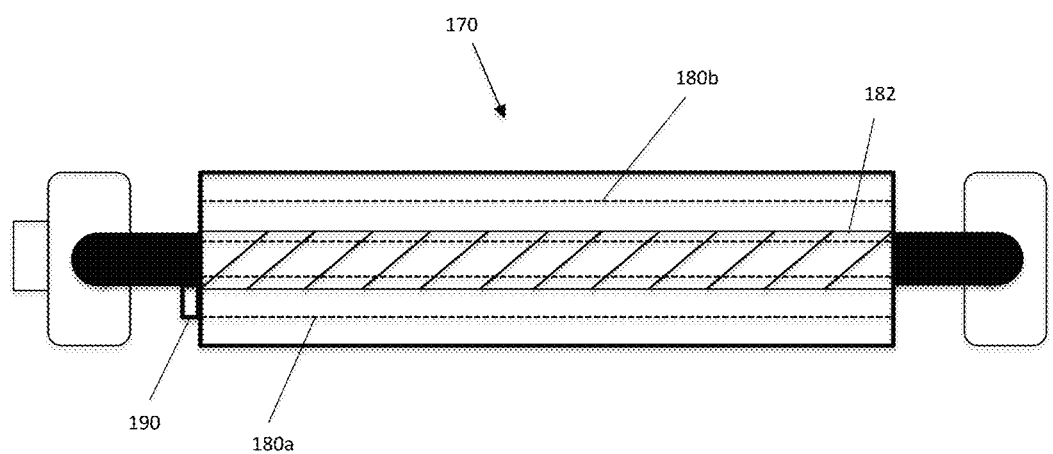
FIG. 5A shows a top schematic view of an alternative cutting head with a single cutting reel and two cutting blades.
Figure 5B:
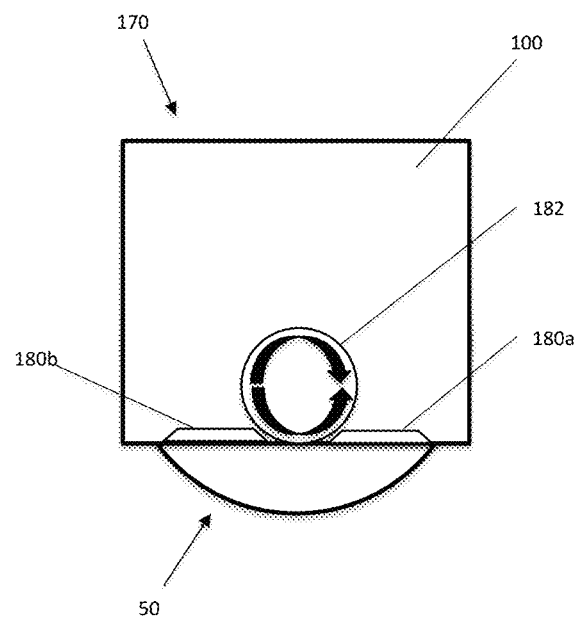
FIG. 5B shows a side schematic view of an alternative cutting head with a single cutting reel and two cutting blades.

An alternative cutting head 170, illustrated in FIGS. 5A-5B, supports one cutting reel 182, a first cutting blade 180*a*, and a second cutting blade 180*b*. Each cutting blade 180*a*, 180*b* is positioned parallel and adjacent to opposite sides of cutting reel 182, with the edge side facing cutting reel 182. Frame 70 supports blades 180*a*, 180*b* so that the edges are approximately tangential to the circumference of the reel 182. A bidirectional hydraulic or electric reel motor 190 drives cutting reel 182 in an overhand motion toward the direction of travel of mower 10. When mower 10 is operated according to the rotational cutting method described below, reel motor 190 reverses direction as mower 10 moves end over end to rotate cutting reel 182 in the direction of travel. As mower 10 moves, motor 190 causes cutting reel 182 to sweep grass against one blade 180; when mower 10 changes directions, motor 190 reverses, and reel 182 sweeps grass against the other blade 180.

Figure 6A:
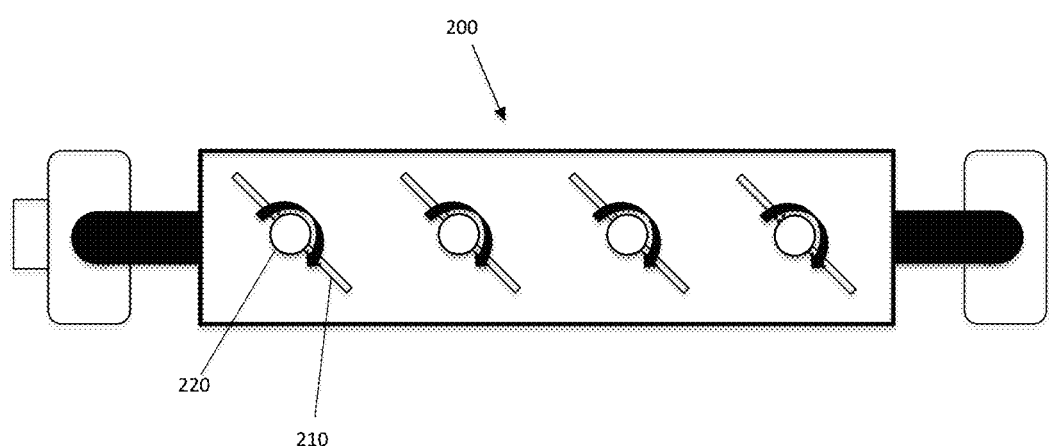
FIG. 6A shows a top schematic view of another alternative cutting head with rotary cutting blades.
Figure 6B:
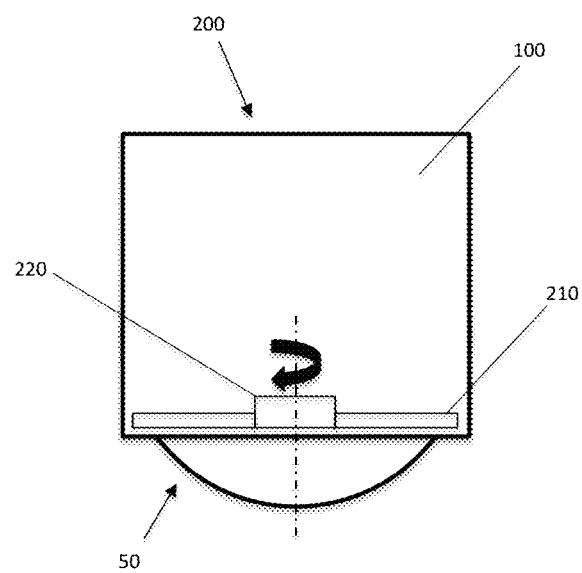
FIG. 6B shows a side schematic view of another alternative cutting head with rotary cutting blades.
Figure 6C:
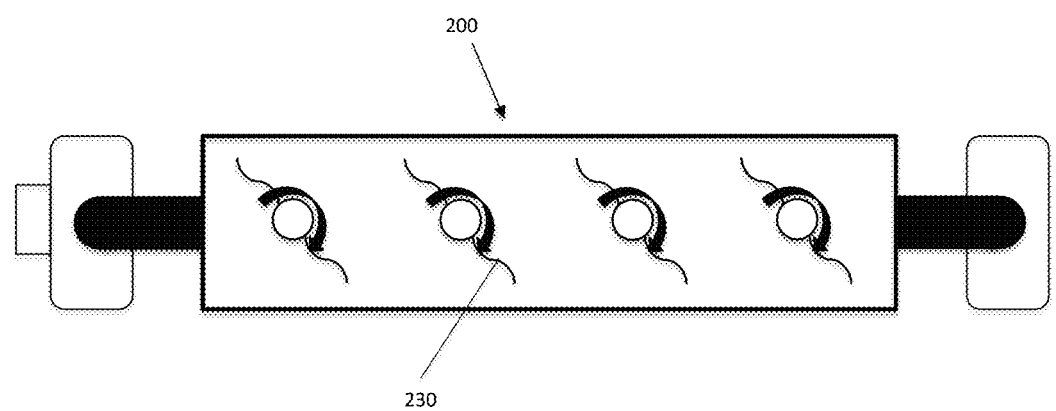
FIG. 6C shows a top schematic view of another alternative cutting head with flexible cutting line.
Figure 6D:
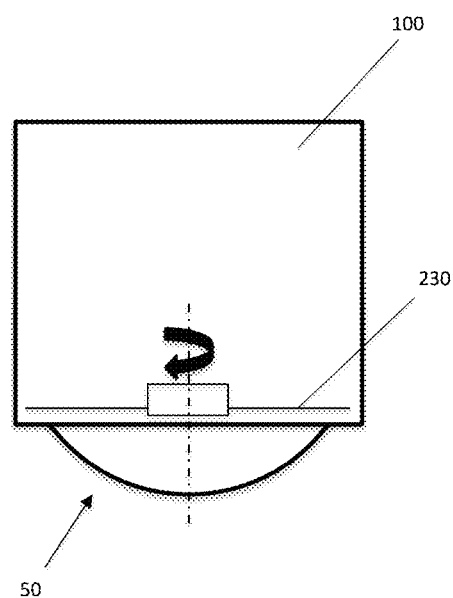
FIG. 6D shows a side schematic view of another alternative cutting head with flexible cutting line.
Figure 7:
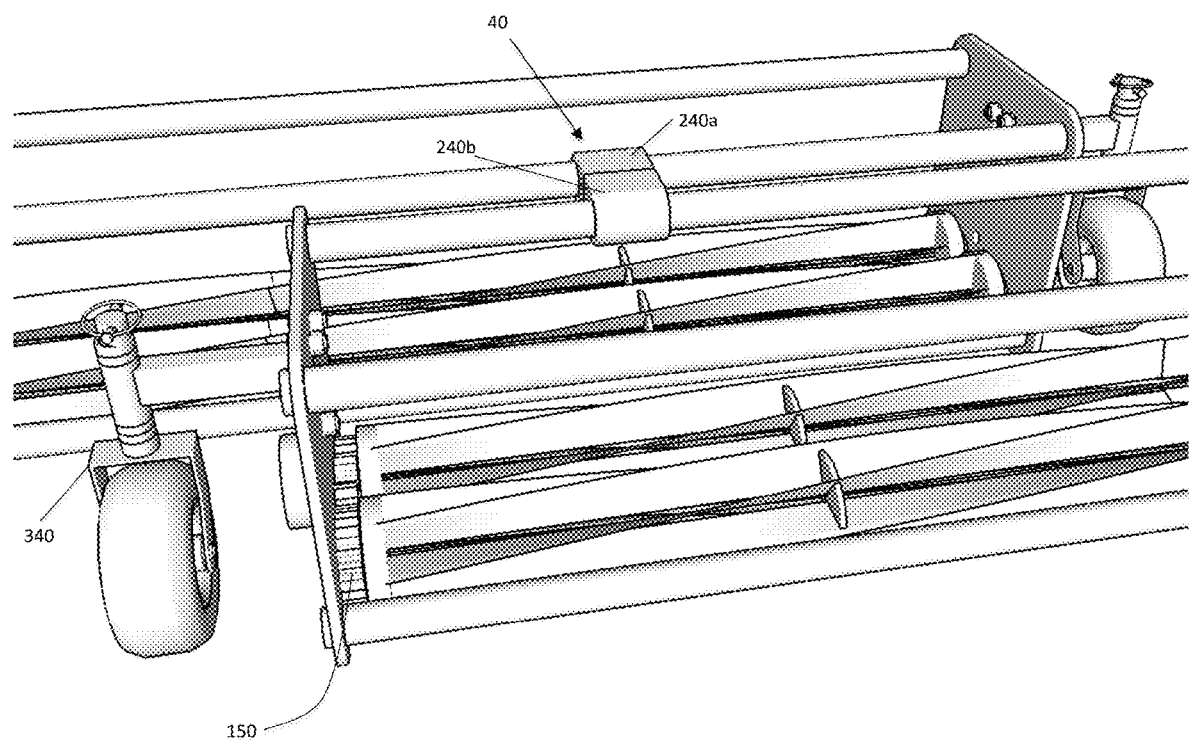
FIG. 7 shows a connector adjoining two cutting heads according to one embodiment of the invention.
Figure 8A:
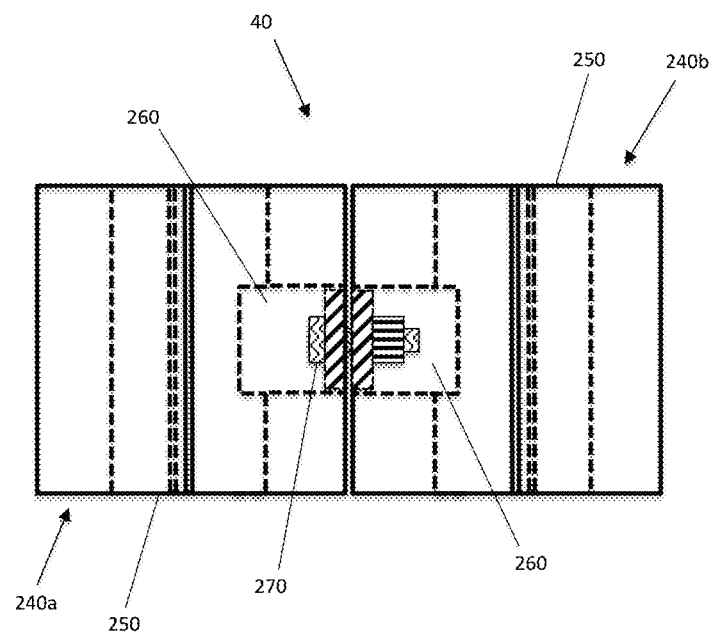
FIG. 8A shows a top view of the connector of FIG. 7.
Figure 8B:
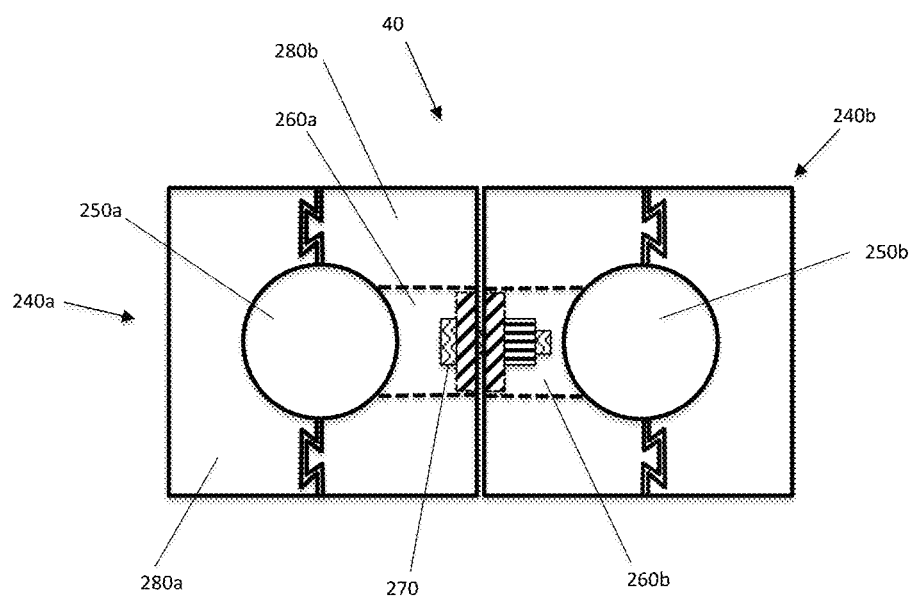
FIG. 8B shows a front view of the connector of FIG. 7
Figure 8C:
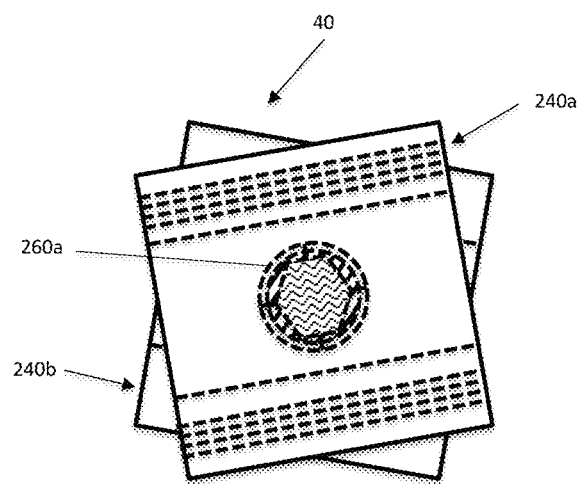
FIG. 8C shows a side view of the connector of FIG. 7, emphasizing the ability to articulate.

Another alternative cutting head 200 is illustrated in FIGS. 6A-6D. The frame elements 110 support a plurality of rotary cutting assemblies, each rotary assembly including a horizontal cutting blade 210 attached to a vertical spindle 220. Flexible cutting line 230 may substitute for fixed cutting blades 210, as shown in FIGS. 6C-6D. Regardless of whether blades 210 or cutting lines 230 are used, each rotary cutting assembly is suspended from a horizontal platform or struts that span the frame elements 110. A motor drives each spindle 220 about its vertical axis either directly (e.g., a hydraulic or electric motor is affixed to each spindle 220) or indirectly (e.g., power from a single motor is transferred to each spindle 220 on the same cutting head via a belt and pulley, geartrain, or hydraulic means). This arrangement could offer advantages in terms of balancing and serviceability. Given the large rotating masses in such a configuration, it may be desirable to cover frame 70 with a shroud or fairing to protect the user from debris.

With reference to the mower 10 in FIGS. 1A-3C, each cutting head 20 pivotally and slidably attaches to each adjacent cutting head by a connector 40. With reference to FIGS. 7, 8A-8C, an illustrated embodiment of connector 40 includes a first and a second retainer 240*a*, 240*b*, each having a primary aperture 250*a*, 250*b* extending therethrough and approximately reflecting the cross section of frame elements 110. Retainers 240*a*, 240*b* also include a secondary aperture 260*a*, 260*b*, respectively, that receives a capture mechanism 270, which couples retainers 240*a*, 240*b* together and enables relative rotation, e.g., as a result of terrain changes (as shown in FIGS. 3A-3C). In the illustrated embodiment, capture mechanism 270 comprises a bolt, washer, and nut assembly. In operation, each primary aperture 250*a*, 250*b* receives a frame element 110 of an adjacent cutting head 20 in a connected configuration. In the connected configuration, each frame element 110 may translate relative to connector 40 as frame elements 110 slide through primary apertures 250*a*, 250*b*. By extension, connector 40 also enables cutting heads 20 to translate relative to one another, such as during the width adjustment method described below or transitions between the extended arrangement and compact arrangement. To facilitate movement, connector 40 may include grease zerks for lubrication, bearings fitted into the retainers, and/or additional structure to reduce the friction between frame elements 110 and the connector 40. Each retainer 240*a*, 240*b* may further include a first part 280*a* that removably mates to a second part 280*b*, thereby enabling selective removal and attachment of connector 40 from cutting head 20; this functionality is useful for the modular adjustment method described below. In addition to enabling cutting heads 20 to translate and pivot relative to one another, connector 40 enables the user to modularly increase or decrease the major cutting width of mower 10 by adding or removing cutting heads 20, such as by performing the modular adjustment method described below.

Mower 10 rides upon wheels 50 and driven wheels 52, which may be affixed to cutting heads 20 (e.g., affixed to end plates 100) or mounted upon separate carriages. Caster wheels are well suited to the methods of use more fully developed below. Each cutting head 20 in the embodiment illustrated in FIGS. 1A-3C includes at least one caster wheel 50 affixed to an end plate 100. Additionally, each outermost cutting head 20 includes a driven wheel 52 affixed to an end plate 100. Additional wheels 50 mounted between end plates 100 (e.g., mounted on one or more frame elements 110) could facilitate the mower's 10 movement by reducing ground pressure and by preventing "high-siding." In the illustrated embodiment of a driven wheel 52 in FIGS. 9A-9B, each driven wheel 52 includes a mounting plate 290 affixed to a caster arm 300, which is affixed to a yoke collar 310. Yoke collar 310 slidably receives a wheel yoke 330, which is connected to a fork 340, a rim 350, a tire 360, a hub 370, and height adjustment spacers 380. By this arrangement, wheel 50 may rotate about the vertical axis of wheel yoke 330. The user can selectively adjust the cutting height by placing height adjustment spacers 380 below caster arm 300 (to increase cutting height) or above caster arm 300 (to decrease cutting height).

While it is possible for mower 10 to include all passive, non-propelled wheels 50, the inclusion of driven wheels 52 may enable it to achieve commercially-attractive capabilities, including higher cutting capacities, safer operation, and easier transportation. Ideally, driven wheels 52 are capable of reversing the driven direction. Additionally, it is advantageous for driven wheels 52 to be steerable. Equipping mower 10 with a steerable, driven wheel 52 at each outer-most cutting head 20 enables a high degree of maneuverability and efficiency.

Figure 9A:
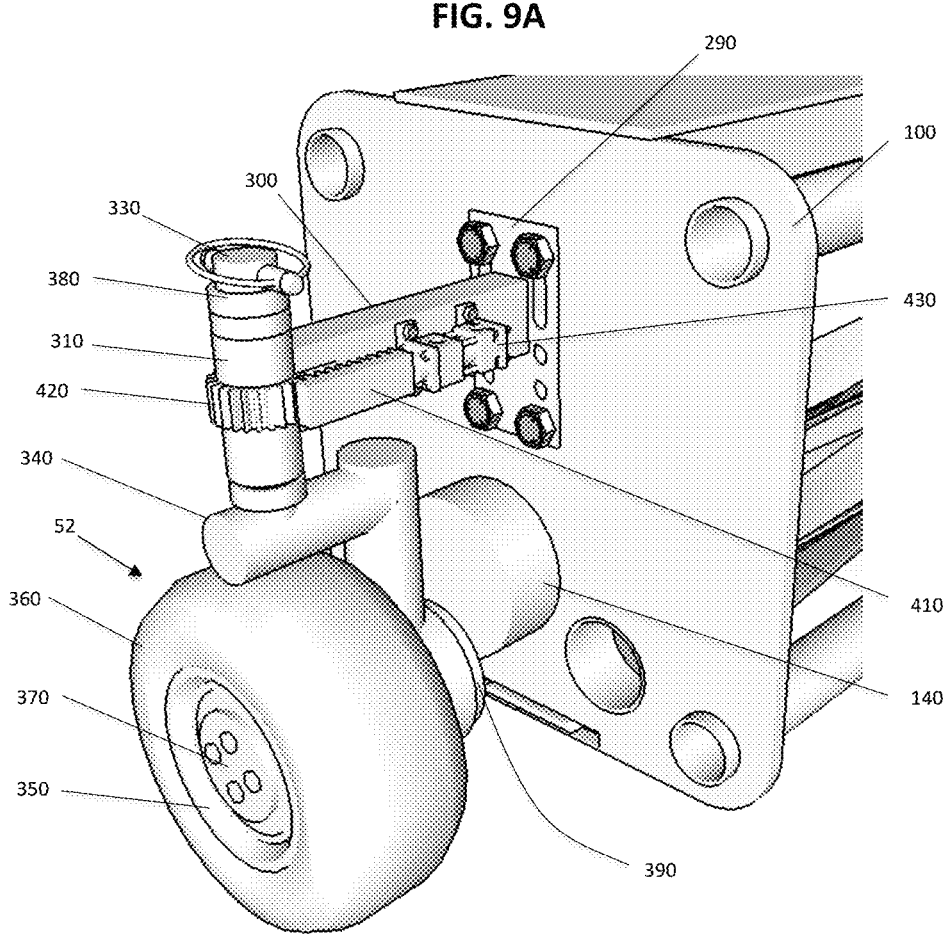
FIG. 9A shows a front perspective view of a driven wheel and steering system according to one embodiment of the invention.
Figure 9B:
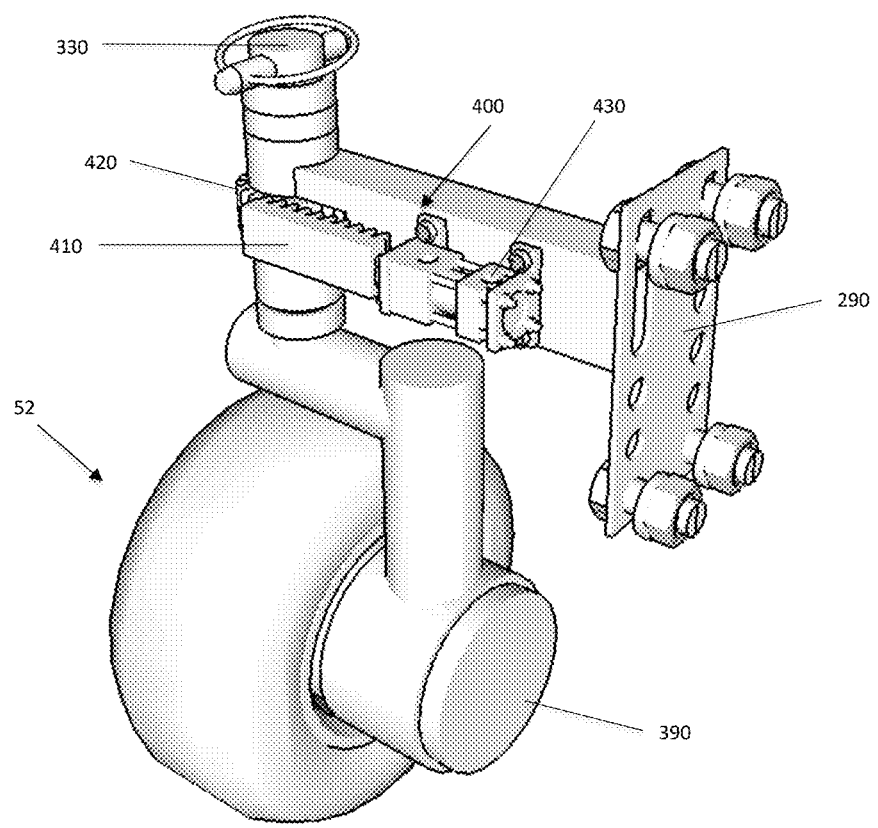
FIG. 9B shows a rear perspective view of a driven wheel and steering system according to one embodiment of the invention.

The embodiment of mower 10 illustrated in FIGS. 1A-3C includes driven wheels 52a, 52e of the type illustrated in FIGS. 9A-9B, one connected to each outer-most cutting head 20a, 20e, respectively. Each driven wheel 52 includes a bi-directional hydraulic wheel motor 390 that drives corresponding driven wheel 52 about its hub axis. Alternatively, wheel motor 390 could be electric, and a geartrain could reside between the wheel motor and the wheel hub in order to increase mechanical advantage. Each driven wheel 52 features a steering system 400, including a rack 410 and a pinion 420 to move driven wheel 52 about its vertical yoke axis. A hydraulic actuator 430 is fastened to caster arm 300, such as with bolts and nuts, and connects to rack 410. Actuator 430 or connected tubing and/or wiring may include a pressure relief valve that enables wheel yoke 330 to rotate about its axis with less resistance. Pinion 420 mates with yoke 330 at a height so that the teeth of pinion 420 engage the teeth of rack 410. A spline joint may couple the rotation of yoke 330 and pinion 420, while preserving the relationship between pinion 420 and rack 410 as the user adjusts the cutting height by selectively placing height adjustment spacers 380 above or below caster arm 300. In operation, as actuator 430 drives rack 410 outward, its teeth engage pinion 420, causing yoke 330 to rotate about its axis. Also, when actuator 430 stops, it may hold yoke 330 in a fixed position with respect to its axis unless the pressure relief valve is actuated. By this structure, the user can precisely steer driven wheel 52. An electric actuator and electric motor could replace actuator 430 and hydraulic wheel motor 390, respectively. Furthermore, numerous forms of gearing could induce wheel yoke 330 to rotate about its vertical axis instead of a rack and pinion arrangement. For example, a worm driven by a motor with a horizontal shaft could engage a worm gear mounted along the wheel yoke, or a bevel gear driven by a motor with a horizontal shaft could engage another bevel gear mounted along the wheel yoke, or a pinion gear driven by a motor with vertical shaft could engage another pinion gear mounted along wheel yoke 330.

To power reel motors 140, rotary motors 190, wheel motors 390, and actuators 430, the mower 10 may support its own power source 60, which may include an internal combustion engine, a battery, a solar panel array, a fuel cell, or other source. For applications where electricity is available, mower 10 may be configured to draw power from an electrical grid, e.g., via a cord. Depending on whether the motors are hydraulic or electric, embodiments equipped with an internal combustion engine may include a hydraulic system (e.g., including a hydraulic pump, fluid reservoir, and throttling valves), an electrical system (e.g., including a magneto or alternator), a pneumatic system (e.g., including a compressor and air tank), or a combination of two or more systems. The tubing, wiring, piping, and other structure inherent to such systems is known in the art and assumed to operatively integrate with power source 60, reel and/or rotary motors 140, 190, wheel motors 390, and actuators 430.

The user may control mower 10 by direct and remote methods known in the art. It is envisioned mower 10 will feature a remote control system comprising a controller to accept user inputs (e.g., steering angle, driven wheel speed, cutting reels on/off) and transmit signals corresponding to those inputs, and a receiver and a processor located on the mower to receive and manipulate the signals, respectively. The mower may also include sensors to record signals corresponding to useful parameters, e.g., fuel level, engine coolant temperature, engine RPM, cutting reels on/off, and ground speed. In such embodiments, the mower 10 will utilize a transmitter or a transceiver to transmit this information back to the controller. The controller and receiver may communicate directly (e.g., through RF) or indirectly (e.g., through GPS or cellular infrastructure). Alternatively, the user may manipulate mower 10 via a controller tethered via an umbilical connection that may include electrical wiring and hydraulic lines. Regardless of the control system selected, the controlling methods are known in the art and presumed to operatively control the individual components and overall system of the present invention.

In operation, the user performs a rotational cutting method to cause mower 10 to mow grass in an end-over-end motion as illustrated in FIG. 10. For example, with reference to FIGS. 1A-3C, 9A-9B, the user manipulates first and second driven wheels 52a, 52e corresponding to the outermost cutting heads 20a and 20e, respectively. To perform the rotational cutting method, the user first actuates actuator 430 of steering system 400 of cutting head 20a, causing the attached rack 410 to translate, and the enmeshed pinion 420 and yoke 330 to rotate about the vertical yoke axis until the hub axis of the first driven wheel 52a becomes approximately parallel to the major cutting width axis 32. In other words, the user steers first driven wheel 52a until its direction of travel is approximately perpendicular to the major cutting width axis 32. Second, with cutting reels 30 rotating, the user actuates wheel motor 390 of first driven wheel 52a for a period of time, causing mower 10 to pivot about second driven wheel 52e. After causing mower 10 to pivot about second driven wheel 52e by a desired degree (e.g., 180 or 540 degrees), the user then executes the third step by actuating actuator 430 of steering system 400 of second driven wheel 52e, causing the attached rack 410 to translate, and the enmeshed pinion 410 and yoke 330 to rotate about the vertical yoke axis until the hub axis of second wheel 52e becomes approximately parallel to the major cutting width axis 32. Fourth, the user actuates wheel motor 390 of second driven wheel 52e for a period of time, causing mower 10 to pivot in the same direction as in step two about first driven wheel 52a (e.g., by 180 or 540 degrees). By repeatedly executing the first through fourth steps, the user can cause mower 10 to mow grass while moving in an end-over-end motion. The method is effective for both clockwise and counterclockwise motion. In practice, if the user causes mower 10 to pivot in a clockwise direction by 180 degrees about second driven wheel 52e (steps one and two), and then in a clockwise direction by 180 degrees about first driven wheel 52a (steps three and four), mower 10 will advance in a linear direction while covering semicircular areas of ground. Alternatively, if the user causes mower 10 to pivot by 540 degrees about second driven wheel 52e, and then 540 degrees about first driven wheel 52a, mower 10 will advance in a linear direction while covering circular areas of ground, as illustrated in FIGS. 11A-11B. Because mower 10 covers circular areas of ground, the covered area is proportional to the square of the major cutting width. Separately, the total area that mower 10 can cover is proportional to the rotational velocity with which it pivots about driven wheels 52*a*, 52*e*. Thus, by using the aforementioned rotational cutting method to operate mower 10 with a large major cutting width and high rotational velocity, the user can mow very large areas of grass in short time periods. The cutting rate of the mower while performing the rotational cutting method can be modeled by the following equation.

$$C = (1-k) z \Pi r^2$$

where:
C=cutting rate (e.g., square feet per hour)
k=loss factor attributable to overlap between passes (dimensionless)
z=rotational rate (e.g., rotations per hour)
r=major cutting width (e.g., feet)

To cause mower 10 to increase or decrease its major cutting width, the user performs a width adjustment method by first actuating actuators 430 of the first and second steering systems 400 corresponding to cutting heads 20*a*, 20*e*, causing the connected racks 410 to translate until the hub axes of driven wheels 52*a*, 52*e* become approximately parallel to each other and perpendicular to the major cutting width axis 32. In other words, the user steers driven wheels 52*a*, 52*e* so that the direction of travel of each is parallel to the major cutting width axis 32. With driven wheels 52*a*, 52*e* pointing in the same direction and parallel to major cutting width axis 32, the user actuates wheel motors 390 in opposite directions, thereby causing driven wheels 52*a*, 52*e* to drive away from each other (thereby causing the major cutting width to increase until it reaches the maximum major cutting width) or inwardly in opposite directions (thereby causing the major cutting width to decrease until it reaches the minimum major cutting width). During either of these operations, cutting heads 20 translate relative to one another along their longitudinal axes by virtue of connectors 40. The user may actuate wheel motors 390 simultaneously or in sequentially. Instead of manipulating both driven wheels 52*a*, 52*e*, the user may alternatively increase or decrease the major cutting width by steering either driven wheel 52*a* or 52*e* in a direction parallel to the major cutting width axis 32, and then actuating that wheel 52 as necessary.

Figure 12:
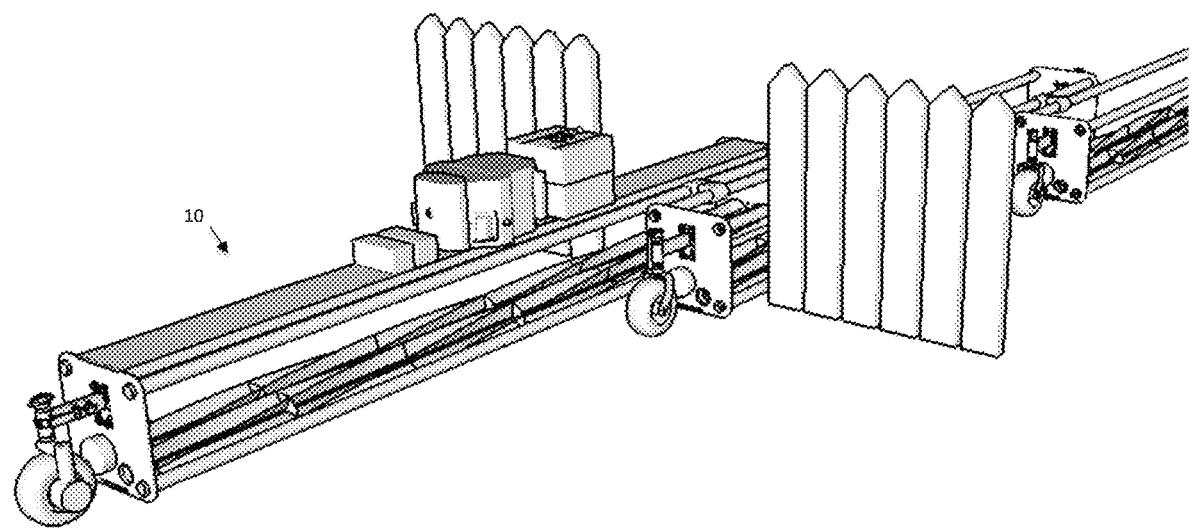
FIG. 12 shows a translational method according to one embodiment of the invention.

To cause mower 10 to move linearly, the user performs a translation method by first actuating actuators 430 of first and second steering systems 400 corresponding to cutting heads 20*a*, 20*e*, causing the connected racks 410 to translate until the hub axes of driven wheels 52*a*, 52*e* are approximately parallel to each other. Second, the user actuates wheel motors 390 of driven wheels 52*a*, 52*e* in the same direction, thereby causing mower 10 to move in the direction of travel of driven wheels 52*a*, 52*e*. By executing this method, mower 10 can cut swaths of grass as wide as its major cutting width while moving linearly. On the other hand, by executing this method when the hub axes of driven wheels 52*a*, 52*e* are pointed in a direction approximately perpendicular to the major cutting width axis 32, mower 10 can proceed through openings narrower than its major cutting width, as illustrated in FIG. 12.

Figure 13:
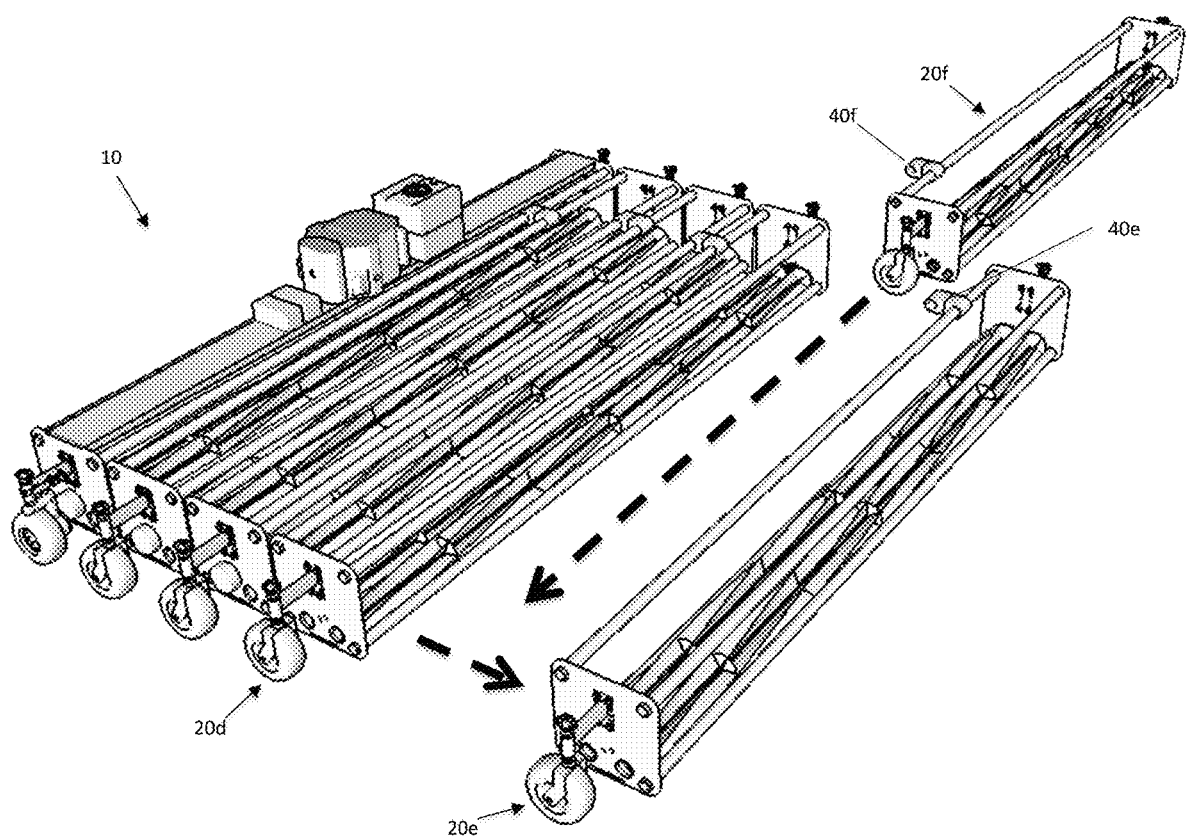
FIG. 13 shows a modular adjustment method according to one embodiment of the invention.

To increase the maximum major cutting width of mower 10, the user performs a modular adjustment method, illustrated in FIG. 13. The user accomplishes this by inserting or removing one or more intermediate cutting heads 20 to mower 10. To add an additional cutting head (e.g., cutting head 20*f*), the user first disconnects a first cutting head (e.g., cutting head 20*d*) from an adjacent cutting head (e.g., cutting head 20*e*) by disconnecting the adjoining connector (e.g., connector 40*e*). Next, the user connects an additional cutting head (e.g., cutting head 20*f*) to first cutting head 20*d* via connector 40*f*. Finally, the user connects cutting head 20*f* to cutting head 20*e* via connector 40*e*.

Thus, from the foregoing discussion the reader will see that at least one embodiment of the invention is unique as a modular assembly of slidably connected cutting heads 20 capable of performing a novel maneuvers that enhance productivity and create novel mowing patterns. For example, with driven wheels 52*a*, 52*e* positioned at opposite ends of mower 10, it is capable of performing an end-over-end cutting motion (thereby linking the cutting rate to the square of its major cutting width) and traversing passages narrower than its major cutting width, unlike mowers known in the art. Nevertheless, additional drive wheels could prove advantageous, such as to facilitate movement across low-traction terrain. Indeed, when each wheel has full rotational capability about its vertical yoke axis, there are many more possible intermediate positions and maneuvers. When the direction of travel of a driven wheel 52 is changed as wheel motor 390 drives the wheel, additional maneuvers are possible. For example, the user can execute an end-over-end maneuver with a continuously decreasing major cutting width by steering one driven wheel 52 to an acute angle with respect to the major cutting width axis 32 as a drive wheel 52 propels one end of mower 10. Additionally, the user can move mower 10 in a linear manner while continuously increasing or decreasing the major cutting width by executing the linear movement described above, with one driven wheel 52 steering at an obtuse angle with respect to cutting head 20 (thereby causing the major cutting width to increase as the mower 10 moves forward) or an acute angle with respect to cutting head 20 (thereby causing the major cutting width to decrease as mower 10 moves forward). These additional maneuvers could be useful for mowing regions with irregular dimensions, as are commonly encountered in the industry. Accordingly, the scope should be determined by the appended claims and the legal equivalents thereof, not by the illustrated embodiments.

Thus, the invention provides a mower comprising a variable, connected array of cutting heads capable of achieving high cutting capacities and of performing a novel rotational cutting method, while also alleviating known mobility and access problems associated with mowers known in the art. Various features of the invention are set forth in the following claims.

I claim:

1. A system comprising:
a plurality of connected cutting heads variable between a first state and a second state,
wherein in the first state, the plurality of connected cutting heads has a first cutting width and two cutting heads of the plurality of connected cutting heads overlap by a first overlap amount along a cutting width axis,
wherein in the second state, the plurality of connected cutting heads has a different second cutting width and the two cutting heads overlap by a different second overlap amount along the cutting width axis,
wherein at least one connector translatably joins the two cutting heads of the plurality of connected cutting heads.

2. The system of claim 1, wherein the at least one connector pivotably joins the two cutting heads of the plurality.

3. The system of claim 1, wherein the two cutting heads of the plurality of connected cutting heads each comprise a frame element, and wherein the at least one connector couples together the frame elements of the two cutting heads.

4. The system of claim 3, wherein the at least one connector is configured to translate along the frame element of each of the two cutting heads.

5. The system of claim 1, further comprising a first driven wheel supported at a first end of the plurality of connected cutting heads.

6. The system of claim 5, further comprising a second driven wheel supported at a second end of the plurality of cutting heads, opposite the first end.

7. The system of claim 1, wherein in the second state, the two cutting heads entirely overlap along the cutting width axis.

8. The system of claim 1, wherein the two cutting heads of the plurality of connected cutting heads each comprise a frame element, and wherein the at least one connector pivotably and translatably couples together the frame elements of the two cutting heads.

9. The system of claim 8, further comprising a first pivotable wheel supported at a first end of the plurality of connected cutting heads.

10. The system of claim 9, further comprising a second pivotable wheel supported at a second end of the plurality of cutting heads, opposite the first end.

11. The system of claim 10, wherein at least one of the first pivotable wheel or the second pivotable wheel is a driven wheel powered by a motor.

12. The system of claim 11, wherein at least one of the first pivotable wheel or the second pivotable wheel is steerable.

13. A system, comprising:
a plurality of connected cutting heads variable between a first state and a second state; and
a first driven wheel supported at a first end of the plurality of connected cutting heads,
wherein in the first state, the plurality of connected cutting heads has a first cutting width and two cutting heads of the plurality of connected cutting heads overlap by a first overlap amount along a cutting width axis,
wherein in the second state, the plurality of connected cutting heads has a different second cutting width and the two cutting heads overlap by a different second overlap amount along the cutting width axis.

14. The system of claim 13, wherein the first driven wheel is steerable.

15. The system of claim 13, further comprising a second driven wheel supported at a second end of the plurality of connected cutting heads.

16. The system of claim 15, wherein the first driven wheel is steerable independently from the second driven wheel.

17. The system of claim 16, wherein both the first driven wheel and the second driven wheel are independently steerable.

18. A system, comprising:
a plurality of connected cutting heads variable between a first state and a second state,
wherein in the first state, the plurality of connected cutting heads has a first cutting width and two cutting heads of the plurality of connected cutting heads overlap by a first overlap amount along a cutting width axis extending along the plurality of connected cutting heads,
wherein in the second state, the plurality of connected cutting heads has a different second cutting width and the two cutting heads overlap by a different second overlap amount along the cutting width axis,
wherein the two cutting heads are configured to translate relative to each other along the cutting width axis between the first and second states.

19. The system of claim 18, wherein a steerable driven wheel supported at an end of the plurality of connected cutting heads is configured to cause the two cutting heads to translate relative to each other along the cutting width axis between the first and second states.

20. A mower comprising the system of claim 18.

* * * * *